United States Patent [19]
Pucillo

[11] Patent Number: 5,908,501
[45] Date of Patent: Jun. 1, 1999

[54] COMPOSITION AND A METHOD FOR PREVENTING DUSTFALL FROM MATERIAL

[76] Inventor: Patric M. Pucillo, 145 Main Ave. #3, Ocean Grove, N.J. 07756

[21] Appl. No.: 09/013,972

[22] Filed: Jan. 27, 1998

[51] Int. Cl.⁶ .............................. C09D 1/04; C04B 12/04
[52] U.S. Cl. ................... 106/634; 106/600; 106/618; 106/624; 106/625; 428/375; 428/392; 428/393; 427/397.8; 427/421; 427/387; 427/393.6; 427/407.3; 524/442
[58] Field of Search .................................. 106/38.3, 38.35, 106/600, 618, 624, 625, 634; 428/375, 393, 392; 427/421, 397.8, 387, 393.6, 407.3; 524/442

[56] References Cited

U.S. PATENT DOCUMENTS

| | | | |
|---|---|---|---|
| 4,347,150 | 8/1982 | Arpin | 510/110 |
| 4,380,595 | 4/1983 | Arpin | 427/221 |

*Primary Examiner*—Michael Marcheschi
*Attorney, Agent, or Firm*—Brady, O'Boyle & Gates

[57] ABSTRACT

A coating composition for preventing or reducing the amount of labile particulate matter released from a surface of a material which comprises a water soluble alkali metal silicate, or acrylic polymer latex and a surfactant. The coating composition is particularly applicable to the materials used for thermal and acoustical insulation, and most particularly to the coating of silicon containing materials.

15 Claims, 1 Drawing Sheet

COMPOSITION AND A METHOD FOR PREVENTING DUSTFALL FROM MATERIAL

BACKGROUND OF THE INVENTION

The present invention relates to coating compositions and a method for preventing dustfall from materials from which particulate matter is generated and easily dispersed. More particularly, the invention is concerned with coating materials used for acoustical insulation, thermal insulation, decorative finishes, and loose packing materials. It is especially applicable for the treatment of silicon-containing materials.

DESCRIPTION OF THE PRIOR ART

Most insulating materials useful for the home or the workplace have certain features that are common. Generally, they are light for their bulk (low-density), soft and fluffy, or foam. These characteristics result because the insulating materials contain pockets of air. The air pockets resist the flow of heat. This resistance is referred to as an R-value, and is based on heat transfer through a square foot of a material, one-inch thick, in one hour when the temperature differential between the faces of the material is one degree Fahrenheit. The R-value depends on both the composition and thickness of material. By far the most common material used for insulation consists of glass fibers and rock wool. Fiberglass and rock wool account for more than 90 percent of all the insulation sold in the United States. These materials are generally marketed in long rolls referred to as blankets or pre-cut flexible rectangles called batts. Fibers can also be used as loose-fill insulation which may be poured or blown onto attic floors or into hollow walls. Besides fibers, loose fill may consist of pellets or granules, usually vermiculite or perlite are used in this form. The disadvantage with these materials is that particles are easily released and dispersed by mere handling which is usually associated with friable materials. Further, these particles can irritate the eyes, skin, and lungs, therefore, steps are required to avoid contact and the use of a masks, goggles, and gloves. Friable material is material that can be pulverized or reduced to powder under hand pressure. Strictly construed, fiberglass and rock wool do not fit this definition; however, for the purpose of this disclosure, all the aforementioned insulating material will be considered friable material.

The remaining commercial insulating materials or synthetic polymers such as polystyrene in pellet or rigid board forms, polyethylene in sheet form, and polyurethane in preformed foams or as formed in situ. In the latter technique, the urethane foam fills the void completely, then cures to a rigid mass.

Cellulosic material is another type of insulation that may be used and is supplied in blanket, batts, and loose fill. The biggest disadvantage is that the cellulose material is flammable unless it is chemically treated. The coating composition of the present invention imparts fire retardant properties to cellulosic materials.

For many years, asbestos had been widely used in building construction as a fireproofing agent and in acoustical and thermal insulation. This extensive use of asbestos has created a health hazard of serious consequences for persons inhaling or ingesting the substance. Federal regulations under various laws now prohibit the use of asbestos for these purposes. However, some of the previously installed asbestos-containing material is now known to be damaged or deteriorating and releasing fibers into the environment. In such cases Federal law requires that this material be removed or sealed.

To this end, U.S. Pat. Nos. 4,347,150 and 4,380,595 disclose compositions for the wet removal of friable insulation material and of an encapsulating sealant for the same materials.

U.S. Pat. No. 4,347,150 discloses a penetrating two part stripping composition useful for removing a friable material, one part comprising an aqueous silicate solution comprising a water soluble metal silicate such as potassium silicate or a mixture of potassium silicate and sodium silicate and a cationic or nonionic surfactant and the second part comprising an acrylic polymer latex and a reagent that reacts with the alkali metal silicate. The two component parts are mixed to provide a blended composition ready for application having a solids content between 5 and 30 weight percent. The stripping composition is particularly useful for wet removal of friable asbestos-containing materials.

U.S. Pat. No. 4,380,595 relates to a penetrating sealant composition useful for encapsulating a friable material which is designed to be stored in two parts, one part comprising an aqueous silicate solution comprising a water soluble alkali metal silicate such as potassium silicate or a mixture of potassium silicate and sodium silicate and a cationic or nonionic surfactant and the other part comprising an acrylic polymer dispersion component comprising an acrylic polymer latex and a reagent that reacts with alkali metal silicate. The two parts are mixed just before use to provide a blended composition having a solid content between 20 to 65 weight percent. The sealant composition is particularly useful for friable asbestos-containing materials, and the cured sealant provides a physically tough flexible barrier having a cohesive mass of encapsulated friable material having good resistance to mechanical abuse.

Each of the above-described patents are directed to uses and purposes different from the composition and method of the present invention. U.S. Pat. No. 4,347,150 is concerned with a stripping composition for the wet removal of friable asbestos-containing materials. U.S. Pat. No. 4,380,595 relates to a sealant composition for providing a physically tough coating which can withstand abrasions and impacts.

The present coating composition is directed to preventing or substantially reducing the amount of particulate matter released from the surfaces of a material, specifically an insulating material. This reduction improves the handling, i.e., less irritability of materials such as fiberglass and rock wool, and makes the work environment safer. Further, the coating composition of this invention does not affect the R-value or the flexibility characteristics of the insulating material.

Each of the above prior art patents require a reagent to be reacted with the silicate component. That system requires that the reagent and the silicate component remain separated until use. However, upon mixing these components, the working or "pot life" is limited. On the other hand, the coating composition of this invention is a single system and does not have "pot life" drawbacks.

The limited pot life of the Arpin composition has several disadvantages, especially on a large commercial scale. First, only limited quantities of the components can be mixed prior to use. Secondly, the mixed amounts must be constantly monitored if they are to be machine applied. Consequently, such procedures slow production runs, are labor intensive, and increase manufacturing costs.

This, notwithstanding the Arpin composition described and claimed in U.S. Pat. No. 4,380,595, is directed to an encapsulating sealant for friable material which is already installed. There is no disclosure, teaching, or suggestion of using this Arpin composition during the manufacturing stage or during the installation of the insulating material, such as fiberglass, to eliminate the skin irritability usually attendant during the handling as does the presently claimed composition.

Finally, the most important advantage of the coating composition of this invention is that it makes the working environment less hazardous either at the manufacturing plant or before or after installation at the job site.

Therefore, a need exists for a coating composition which will suppress the generation of particulate matter from surfaces of materials containing labile particulates and to improve handling without effecting the R-value or flexibility characteristics of the material.

SUMMARY OF THE INVENTION

The present invention provides a coating composition and a method which prevents or reduces the amount of particulate matter released from surfaces where particulate matter is easily generated, released and dispersed into the environment. More particularly, the invention relates to a coating for insulation material which substantially reduces the suspended particulate matter with resultant improved handling but does not affect the flexibility or the R-value characteristics of the material.

Specifically, the coating composition consists essentially of:

a) from about 25 to 50, preferably about 30 to 40 and more preferably about 35 to 40 weight percent potassium silicate, sodium silicate, or mixtures thereof;

b) from about 0.5 to 15, preferably about 1 to 10 weight percent of an acrylic polymer selected from homopolymers and copolymers of lower alkyl esters of acrylic acid or lower alkyl esters of an alpha-lower alkyl acid or mixtures thereof;

c) from about 0.01 to 1, preferably 0.01 to 0.1 weight percent of a cationic or nonionic surfactant or mixtures thereof; and d) from about 40 to 65, preferably 60 to 65 weight percent water;

based on the weight of the total composition.

The invention also provides a method for preventing or substantially reducing the amount of particulate matter from surfaces where particulate matter is easily generated, released, and dispersed into the environment. Such surfaces include insulating materials of which are the primary concern of this invention. Insulating materials of particular interest include friable material (asbestos, mineral-rock and slag-wool) fiberglass, cellulosic material, perlite and vermiculite. All of these materials are supplied for insulating purposes as loose fills which upon handling are prone to dusting. The insulating wools, asbestos, cellulosic material, and fiberglass are available in flexible batts or blanket form. When applied to a flexible insulation material, the composition of the present invention impregnates the material with a protective coating to a greater extent than known silicate solutions having comparable molar concentrations because of the lower viscosity of the solution of the present invention. Further, as mentioned above, neither the flexibility nor the R-value of the material are compromised.

Other insulating materials such as polystyrene (rigid boards and loose fill) and polyurethane (foam) may be treated to impart nonflammable properties thereto.

It is an object of this invention to provide a method and a coating composition which prevents or substantially reduces the amount of particulate matter released from surfaces where particulate matter is easily generated, released, and dispersed into the environment.

Another object of this invention is to provide a method and a coating composition which is inexpensive, easy to apply and improves the handling characteristics and thereby decreasing the irritability of the material.

And still another object of the present invention is to provide a method and composition which do not affect the appearance, flexibility, and R-values of the material.

Yet another object of this invention is to provide a method and composition for the properties of a relatively thin impervious or substantially impervious coating on insulation material.

Other, and further objects of this invention, will be apparent from the following detailed description thereof which is set forth for the purpose of explaining the invention and is not regarded as necessarily limiting the scope of the invention which is defined in the appended claims.

DESCRIPTION OF THE PREFERRED EMBODIMENTS

Figure 1:
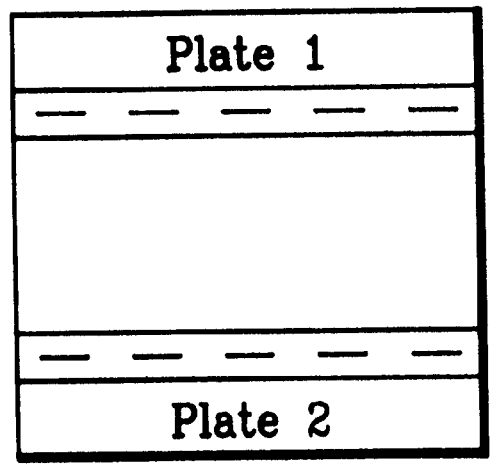
FIG. 1 is a representation of Configuration B of Figure A2.1 of ASTM C518-91.

According to this invention, a composition and a method have been found which are especially suitable for coating insulation and other surfaces in which particulate matter is easily generated, released, and dispersed into the atmosphere. The coating composition consists essentially of three ingredients: an alkali metal silicate, an acrylic polymer, and a cationic or nonionic surfactant in an aqueous solvent.

The coating composition of the present invention consists essentially of:

a) from about 25 to 50 weight percent alkali metal silicate selected from potassium silicate, sodium silicate, or mixtures thereof;

b) from about 0.5 to 15 weight percent of an acrylic polymer selected from homopolymers and copolymers of lower alkyl esters of acrylic acid or lower alkyl esters of an alpha-lower alkyl acid or mixtures thereof;

c) from about 0.01 to 1 weight percent of a cationic or nonionic surfactant or mixtures thereof; and d) from about 40 to 60 weight percent water;

based upon the weight of the total composition.

The alkali metal silicates suitable for use in this invention includes aqueous potassium silicate solutions, aqueous sodium silicate solutions, and mixtures thereof are commercially available. Aqueous potassium silicate solutions are available having a solids content ranging from about 25 to 50 weight percent and has a molar ratio of $K_2/SiO_2$ between 1 to 4. A preferred potassium silicate solution has a solids content of from about 25 to 45 weight percent. Aqueous sodium silicate solutions have a solids content of from about 15 to 55 weight percent and have a molar ratio of $Na_2O/SiO$ between 1 to 4. A preferred sodium silicate solution has a solids content of about 28 to 45 percent having a molar ratio by weight of from about 1:26 to 1:39.1 for $Na_2O/SiO_2$. The aqueous silicate solution preferably consists of a solution containing from about 5 to 50 weight percent sodium silicate and from about 50 to 95 weight percent potassium silicate.

While it is most preferable that all the soluble silicate be in the form of potassium silicate, the mixtures of potassium silicate and sodium silicate having a major portion of potassium silicate provide the advantages of this invention. Preferably, at least about 75 weight percent of the soluble silicate should be potassium silicate and, more preferably, at least about 95 weight percent. Soluble silicates include potassium and sodium orthosilicates, potassium, and sodium metasilicates, potassium and sodium metasilicate pentahydrate, and potassium and sodium sequisilicate. A preferred potassium silicate is marketed by the PQ Corporation, Valley Forge, Pa. under the trademark KASIL® No. 6.

The alkali metal silicate solution may be stabilized, i.e., a precipitation of $SiO_2$ may be prevented, by an addition, if desired, of water-soluble quaternary and/or polyquaternary nitrogen compounds that contain at least one alkyl radical without hydroxyl groups at the quaternary nitrogen atom. Stabilizers of this type are commercially available.

Acrylic polymer latex is an essential ingredient in the present invention. Suitable acrylic polymer latex compositions include homopolymers of lower alkyl esters of acrylic acid or copolymer thereof, i.e., polymers made of two or more different acrylic acid esters and/or alpha-lower alkyl acrylic esters and copolymers of the aforementioned acrylic esters with vinyl acetate. These acrylic polymer latexes are available in emulsion form with a solids content of about 45 to 65 weight percent, a pH of 8 to 10, a viscosity of 2 to 4 poises and ranging from 8.0–9.25 pounds per gallon. In a preferred embodiment of the invention, the acrylic latex emulsion will have a solids content of between about 45 to 50 weight percent, having a pH of about 9, a specific gravity of solids of about 1.0 to 1.2, a weight of about 9 pounds per gallon. The acrylic polymer in the composition provides a substantial portion of the solids content in the composition and in the final coating, i.e., the layer which forms when the composition of this invention is applied to the surface. Any of the numerous commercially available 100% acrylic latex emulsions may be used. Suitable acrylic emulsions include those which are marketed by the Rohm and Haas Company, Philadelphia, Pa. under the tradename RHOPLEX® and those polymer emulsions marketed by the Union Carbide Corporation, Danbury, Conn., under the tradename UCAR®.

Nonionic or cationic synthetic surfactants and mixtures thereof can be employed as ingredients in the composition of the present invention. Preferred nonionic surfactants include the condensation product of aliphatic alcohols having from 8 to 22 carbon atoms, having either straight chain or branch chain configuration, with ethylene oxide, e.g., a coconut alcohol-ethylene oxide condensate having from 1 to 12 moles of ethylene oxide per mole of coconut alcohol, the coconut alcohol fraction having from 10 to 14 carbon atoms; and nonyl phenol condensed with esther about 10 or about 30 moles of ethylene oxide per mole of phenol and the condensation products of coconut alcohol with an average of esther about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan, bis-(N-2-hydroxy ethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole lauramide; and di-isoctylphenol condensed with 15 moles of ethylene oxide.

Suitable cationic synthetic surfactants for use in the present composition include: amine salts, fatty esters of primary, secondary, or tertiary hydroxy alkyl amines, and quaternary ammonium compounds. Specific examples of cationic surfactants include cetyl pyridinium chloride, cetyl trimethyl ammonium chloride, stearyl dimethyl benzyl ammonium chloride, lauryl dimethyl benzyl ammonium chloride, quaternary ammonium chloride, trimethyl octadecyl ammonium chloride, methyl polyethanol quaternary amine, didecyl dimethyl ammonium chloride, tetradecyl benzyl ammonium chloride dihydrate, coco hydroethyl imidazoline, tall oil hydroxyethyl imidazoline, and oleic hydroxyethyl imidazoline.

The concentrations of the above-described surfactants may range from about 0.01 to 10 weight percent, preferably from about 0.01 to 1 weight percent.

The order in which these ingredients are added is not critical. However, in the preferred embodiment, the surfactant and the aqueous alkali metal solution are added with thorough mixing to the water. Then the resultant aqueous solution is added slowly with thorough stirring to the polymer in emulsion form. After combining the components, mixing is continued for approximately one-half hour at an ambient temperature of approximately 70° F.

Obviously, it may be desirable to include or add additional functional materials to facilitate the preparation or application of the coating composition or to impart collateral benefits or properties for coating surfaces, especially friable surfaces. For example, in certain applications, it may be advantageous to include antifreeze compositions, foam inhibitors, ultraviolet absorbers, etc. Additionally, if a colored product is desired, water dispersable alkali-resistant color pigments or a water dispersed dye may be added. Suitable pigments include titanium dioxide, cobalt green, or cobalt blue, cadmium selenite, or cadmium sulfide. Generally, up to about 1 percent of dispersed, alkali-resistant color pigments are used to give the coating composition a desirable color.

A method of preventing or substantially reducing the amount of particulate matter released from a surface, particularly a friable surface, is provided by applying the coating composition of this invention. Although the coating composition can be sprayed, brushed, rolled, or mopped on various surfaces, preferably on dry surfaces, the specific surface will determine the manner of application. On friable surfaces, low pressure spraying is preferred. The coating composition should be applied with as much caution and at as low pressure as possible to reduce surface contact disturbance on friable material since a high concentration of friable material would be released to the environment. In any event, workers should require protection with respiratory devices, goggles, and proper ventilation.

This coverage of the coating composition also varies, depending on the condition of the material and type of application, ranging from about 250 to 500 square feet per gallon, preferably 320 square feet per gallon.

The applied coating composition is "self-cured" or "air cured" at ambient temperatures of at least 55° F. Upon curing, the coating composition provides an effective thin coating upon friable materials which prevents or substantially reduces particulate matter released from the surface. The coating composition accomplishes this objective with sufficient penetration into the friable material matrix as to lock in the particles at the surface but not to change the flexibility or R-value characteristics of the material.

Suitable surfaces to be treated according to this invention include glass fibers, cellulose, the insulating wools, synthetic resin foams (polyurethane, polystyrene, polyvinyl chloride, etc.) and asbestos composition.

In coating fiberglass or other silicon containing material, the coating component of this invention will react with the silicon present in the insulation material forming a chemical bond with the surface particle of the material.

In another embodiment of the invention, the material can be surface-treated at a plant during the manufacturing process by known application techniques. For example, in the making of fiberglass, the composition, according to this invention, could be applied to the surface of the formed fiberglass by a low pressure spray apparatus while the fiberglass was on the machine. Thus, this treatment would reduce the particulate matter in the plant environment and improve the subsequent handling of the coated material by reducing the breathing hazards and skin irritation.

The following are examples of various composition formulations for specific and general use, and their general method of application. It is to be understood that the compositions and the method of use for coating specific materials are exemplary and not considered to limit the inventors to any of the particulate compositions or operating conditions outlined.

Percentages and parts are by weight unless otherwise indicated.

EXAMPLE 1

A coating composition according to the invention had the following formulation:

a) 37 percent of an aqueous alkali metal silicate solution having a solids content: 55.5 weight percent of potassium silicate solution with a molar ratio of 1:3.13 for $K_2O/SiO_2$ and a solids content of 33 percent (KASIL® No. 6, PQ Corporation, Valley Forge, Pa. 19482);

b) 0.1 percent of an octylphenoxy polyethoxy ethanol;

c) 5 percent of an acrylic polymer (RHOPLEX® MC-76 Emulsion, Rohm and Haas Co., Phila., Pa. 19100); and d) 59 percent deionized water.

COMPARISON TESTING

Modified versions of ASTM D 1739-94 (Settleable Particulate Matter) and ASTM D 4096-91 (Suspended Particulate Matter in the Atmosphere) were used to study the amounts of particulate material generated by physical manipulation of Owens-Corning W71-R-38 Attic/Flat Ceiling Fiberglass batting (Product Code 13L68958) in its as-manufactured condition and after treatment with various amounts of the coating composition according to this invention.

ASTM C 518-91 (Steady State Heat Flux Measurements) was used to compare the insulation resistance of the fiberglass batts before and after treatment.

EXAMPLE 2

A specimen of Owens Corning W71 R-38 Attic Flat Ceiling Fiberglass batting Product Code 13L68958 was used for comparison testing purposes. Two foot by four foot batts or insulation were cut in half using a razor edge to provide 2 feet×2 feet sample sections, and three samples were treated using the coating of Example 1 at three different application ranges while three samples were used as controls (a total of 6 batts were used). The coating was applied using the garden type sprayer provided with the flow adjusted to its widest dispersion. Samples were analyzed after allowing to air dry.

For collection of settleable particulate matter, the samples were inserted into a closed 30 inches×36 inches×36 inches environmental chamber fitted with rubber feedthrough gloves. A sheet of coated paper was inserted into the bottom of the chamber with upturned edges. Each batt section was then handled for a period of fifteen minutes above the paper in an inverted configuration (paper side up). Handling involved vertical movement and folding, but the fiberglass was not expanded beyond its 12-inch final size. After this handling, a metal separator was inserted through a feedthrough slot just above the collection paper, and the batt section was lowered onto the separator. With the settleable fibers isolated from the chamber, a high volume flow system (50 cfm) was then applied to collect the airborne fibers from the chamber environment and allowed to operate for a period of ten minutes. After completion of the airborne fiber collection, the paper at the bottom of the chamber was carefully removed and the filter from the air sampler removed (both of which had been weighed prior to analysis). The particles generated by each sample were then weighted and their weights recorded. The results are found in Tables I and II below.

TABLE I

Fiberglass Particle Generation
Settleable Particulate Matter
ASTM D 1729-94 (modified)

| Sample/Coverage | Weight of Particles Collected (g) | % Reduction from Untreated |
|---|---|---|
| Untreated - A | 0.3027 | — |
| Untreated - B | 0.4141 | — |
| Untreated - C | 0.3479 | — |
| Average | 0.35 | — |
| 2.25–2.75 oz/sq.ft. | | |
| Treated - 1A | 0.0033 | 99.07% |
| Treated - 1B | 0.0003 | 99.92% |
| Treated - 1C | 0.0021 | 99.41% |
| Average | 0.002 | 99.5% |
| 0.75–125 oz/sq.ft. | | |
| Treated - 2A | 0.0087 | 97.55% |
| Treated - 2B | 0.0178 | 94.98% |
| Treated - 2C | 0.0125 | 96.48% |
| Average | 0.013 | 95.3% |
| 0.4–0.5 oz/sq.ft. | | |
| Treated - 3A | 0.0263 | 92.59% |
| Treated - 3B | 0.0352 | 90.08% |
| Treated - 3C | 0.0271 | 92.36% |
| Average | 0.030 | 91.7% |

The above confirms that the composition of the invention prevents or substantially reduces the total settleable material after handling. It is clear that the treated batts dramatically prevent or substantially reduce the settleable material from 91.7 to 99.5% compared to the untreated batts.

TABLE II

Fiberglass Particle Generation
Suspended Particulate Matter
ASTM D 4096-91 (modified)

| Sample/Coverage | Weight of Particles Collected (G) | % Reduction from Untreated |
|---|---|---|
| Untreated - A | 0.0158 | — |
| Untreated - B | 0.0115 | — |
| Untreated - C | 0.0187 | — |
| Average | 0.015 | — |

TABLE II-continued

Fiberglass Particle Generation
Suspended Particulate Matter
ASTM D 4096-91 (modified)

| Sample/Coverage | Weight of Particles Collected (G) | % Reduction from Untreated |
|---|---|---|
| 2.25–2.75oz/sq. ft. | | |
| Treated - 1A | 0.0002 | 98.70% |
| Treated - 1B | 0.0001 | 99.35% |
| Treated - 1C | 0.0001 | 99.35% |
| Average | 0.0001 | 99.1% |
| 0.75–1.25oz/sq. ft. | | |
| Treated - 2A | 0.0002 | 98.70% |
| Treated - 2B | 0.0001 | 99.35% |
| Treated - 2C | 0.0003 | 98.24% |
| Average | 0.0002 | 98.8% |
| 0.4–0.5oz/sq. ft | | |
| Treated - 3A | 0.0002 | 98.70% |
| Treated - 3B | 0.0004 | 97.39% |
| Treated - 3C | 0.0003 | 98.17% |
| Average | 0.0003 | 98.1% |

As shown above in Table II, the suspended particulate matter for the untreated batts averaged about 0.015 grams, and the weight of the suspended particle matter for the treated batts was about 0.001 grams. This calculates to a reduction of suspended particle matter ranging from 98.1 percent to 99.1 percent.

Figure 2:
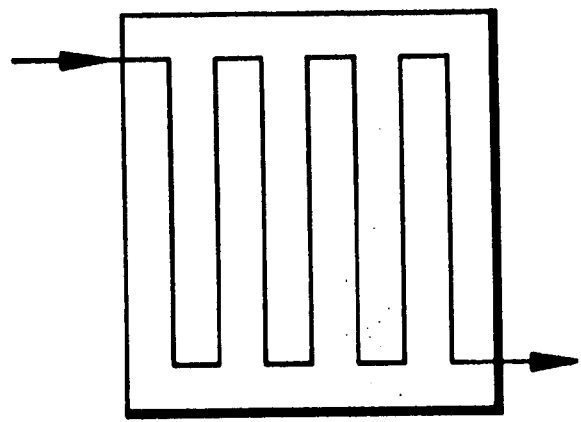
FIG. 2 is a representation of the isothermal plastic similar in construction to Type A of Figure A2.2 of ASTM C518-91.

For measurement of the thermal properties of the untreated and treated fiberglass batts, a heat flow meter apparatus was constructed in accordance with ASTM C518-91 using Configuration B of Figure A2.1, as shown in FIG. 1 of the drawings, with the isothermal plates similar in construction to Type A of Figure A2.2, as shown in FIG. 2 of the drawings, employing both heating and cooling and both bearing hard anodized aluminum surface finishes. Surface temperatures of each plate were measured using J-type thermocouple junctions affixed via surface tabs with high conductivity adhesive and the heat flux transducers were also affixed with high conductivity adhesive. The plate sizes employed in the experiment were 12 inches×12 inches in size and were separated by 10 inches (for the R-38 material) using asbestos cylindrical spacers and by 5 inches for a comparison sample of Owens-Corning R-19 Fiberglass Building Insulation batting (Code C4-6-14-85-B2-3). The lower than nominal thickness values were employed to ensure good contact with the isothermal plates used in the analyses. Measurements were then made using the untreated R-38 material as a control and calculating the variation in insulation resistance for the treated samples and for the comparison sample. Each measurement was repeated five times with a 30 minute interval between readings after the isothermal plates had reached equilibrium. The hot plate was electrically heated to 40° C. and the cold plate was maintained at 20° C. using a water cooled heat exchanger. Both plates were maintained to ±1° C. during the measurements. Density of the R-38 material was found to be 8.44 kg/m$^3$ as tested and the density of the R-19 material was found to be 11.73 kg/m$^3$. The laboratory environment at the time of testing was 21° C. at 40%RH. The results are shows in Table III.

TABLE III

Insulation Resistance Measurements
Heat Flow Meter Apparatus
ASTM C518-91

| Sample/Coverage | (S'*E' + S''*E'')/2 | R-Value |
|---|---|---|
| R-38 | | |
| L = 10" | | |
| Untreated - A | 0.0521 | — |
| Untreated - B | 0.0511 | — |
| Untreated - C | 0.0538 | — |
| Untreated - D | 0.0522 | — |
| Untreated - E | 0.0542 | — |
| Average | 0.0527 | 38.0 |
| R-38 | | |
| L = 10" | | |
| 0.4–0.5 oz/sq.ft. | | |
| Treated - A | 0.0531 | 37.7 |
| Treated - B | 0.0533 | 37.5 |
| Treated - C | 0.0519 | 38.5 |
| Treated - D | 0.0550 | 36.4 |
| Treated - E | 0.0509 | 39.3 |
| Average | 0.0528 | 37.9 |
| R-19 | | |
| L = 5" | | |
| Comparison - A | 0.2541 | 15.7 |
| Comparison - B | 0.2265 | 17.7 |
| Comparison - C | 0.2326 | 17.2 |
| Comparison - D | 0.1985 | 20.2 |
| Comparison - E | 0.2489 | 16.1 |
| Average | 0.2377 | 16.8 |

The insulation quality of the R-38 batts did not appear to be effected by the application of the treatment for particle reduction. Within the error of the experiment (see Table 3) the calculated R-value for the treated material was the same as for the untreated control. The comparison sample of R-19 fiberglass material was found to have a calculated value of R-17. This may be due to the compression of the insulation, errors in the method when analyzing samples with different thickness or to contamination by other particulate material during the lifetime of the insulation since it was placed in service. The overall value of this additional sample was to lend confidence to the methodology and to show that any gross change in insulation resistance of the fiberglass batt was detectable.

While the invention has been described in terms of the various preferred embodiments, the skilled artisan will appreciate that various modifications, substitutions, omissions, and changes may be made without departing from the spirit thereof. Accordingly, it is intended that the scope of the present invention be limited solely by the scope of the following claims including equivalents thereof. For example, the coating compositions can be used to coat loose packing material such as saw dust or even to coat coal when conveyed in open railroad cars.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

What is claimed is:

1. A coating composition for materials having hard or flexible surfaces for preventing or reducing the amount of particulate matter released from said surface consisting essentially of:

a) from about 25 to 50 weight percent of an aqueous alkali metal silicate solution or suspension selected from potassium silicate, sodium silicate or mixtures thereof;

b) from about 0.5 to 15 weight percent of an acrylic polymer selected from homopolymers and copolymers of lower alkyl esters of acrylic acid or lower alkyl esters of an alpha-lower alkyl acid or mixtures thereof;

c) from about 0.01 to 1 weight percent of a nonionic or cationic surfactant or mixture thereof; and d) from about 40 to 60 weight percent water; based on the weight of the total composition.

2. The coating composition of claim 1 wherein the alkali metal silicate comprises from about 30 to 40 weight percent.

3. The coating composition of claim 2, wherein said aqueous silicate solution consists of a solution of potassium silicate.

4. The coating composition of claim 2, wherein the said aqueous silicate solution consists of a solution containing from about 5 to 50 weight percent sodium silicate and from about 50 to 95 weight percent potassium silicate.

5. The coating composition of claim 1 further consisting essentially of a water dispersed dye.

6. The coating composition of claim 1 wherein said surfactant is a nonionic surfactant.

7. A coating composition for flexible insulation materials for preventing or reducing the amount of particulate matter released from said surface consisting essentially of:

a) from about 35 to 40 weight percent of an aqueous alkali metal silicate solution selected from potassium silicate having a solids content within the range of 25 to 45 weight percent;

b) from about 1 to 10 weight percent of an acrylic polymer selected from homopolymers and copolymers of lower alkyl esters of acrylic acids or lower alkyl esters of an alpha-lower alkyl acid or mixtures thereof;

c) from about 0.01 to 0.1 weight percent of a nonionic surfactant; and d) from about 60 to 65 weight percent water; based on the weight of the total composition.

8. A method for preventing or reducing the amount of particulate matter released from a material having a hard or flexible surface which comprises applying an effective amount of the coating composition of claim 1 to said surface.

9. The method of claim 8 wherein said material is a friable material.

10. The method of claim 8 wherein said material is an insulating material.

11. The method of claim 10 wherein said material is selected from asbestos, fiberglass, mineral wool, rock wool, slag wool, or a cellulosic material.

12. Insulation material coated with the composition of claim 1.

13. The insulation material of claim 12, wherein said material is selected from fiberglass, mineral wool, rock wool, slag wool, or a cellulosic material.

14. The insulation material of claim 13, wherein said material is fiberglass.

15. Cellulosic material coated with the composition of claim 1.

* * * * *